United States Patent
Pan et al.

(10) Patent No.: US 11,062,201 B2
(45) Date of Patent: Jul. 13, 2021

(54) CHIP AND CHIP-BASED DATA PROCESSING METHOD

(71) Applicant: Advanced New Technologies Co., Ltd., Grand Cayman (KY)

(72) Inventors: Guozhen Pan, Hangzhou (CN); Jianguo Xu, Hangzhou (CN); Yongchao Liu, Hangzhou (CN); Haitao Zhang, Hangzhou (CN); Qiyin Huang, Hangzhou (CN); Guanyin Zhu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/084,936

(22) Filed: Oct. 30, 2020

(65) Prior Publication Data
US 2021/0049453 A1 Feb. 18, 2021

Related U.S. Application Data

(63) Continuation of application No. PCT/CN2019/101069, filed on Aug. 16, 2019.

(30) Foreign Application Priority Data

Sep. 30, 2018 (CN) .......................... 201811156129.6

(51) Int. Cl.
*G06F 17/00* (2019.01)
*G06N 3/063* (2006.01)
(Continued)

(52) U.S. Cl.
CPC ......... *G06N 3/063* (2013.01); *G06F 9/30149* (2013.01); *G06F 9/3871* (2013.01); *G06F 13/28* (2013.01); *G06F 2213/0026* (2013.01)

(58) Field of Classification Search
CPC .... G06F 17/00; G06F 9/30149; G06F 9/3871; G06F 13/28; G06F 2213/0026; G06N 3/063; G06N 9/06
See application file for complete search history.

(56) References Cited

U.S. PATENT DOCUMENTS 8,225,074 B2 7/2012 Chakradhar et al.
9,715,663 B2 7/2017 Baldini Soares et al.
(Continued)

FOREIGN PATENT DOCUMENTS

CN 101017508 8/2007
CN 105488565 4/2016
(Continued)

OTHER PUBLICATIONS

Abouzahir et al, "Large-Scale Monocular FastSLAM2.0 Acceleration on an Embedded Heterogeneous Architecture," EURASIP Journal on Advances in Signal Processing, Aug. 17, 2016, 7 pages.
(Continued)

*Primary Examiner* — Cheng Yuan Tseng
(74) *Attorney, Agent, or Firm* — Fish & Richardson P.C.

(57) ABSTRACT

Embodiments of the present specification provide chips and chip-based data processing methods. In an embodiment, a method comprises: obtaining data associated with one or more neural networks transmitted from a server; for each layer of a neural network of the one or more neural networks, configuring, based on the data, a plurality of operator units based on a type of computation each operator unit performs; and invoking the plurality of operator units to perform computations, based on neurons of a layer of the neural network immediately above, of the data for each neuron to produce a value of the neuron.

21 Claims, 3 Drawing Sheets

(51) Int. Cl.
*G06F 9/30* (2018.01)
*G06F 9/38* (2018.01)
*G06F 13/28* (2006.01)

(56) References Cited

U.S. PATENT DOCUMENTS

| | | | |
|---|---|---|---|
| 9,798,751 B2 | 10/2017 | Birdwell et al. | |
| 10,073,816 B1 | 9/2018 | Lu et al. | |
| 10,248,908 B2* | 4/2019 | Temam | G06N 20/00 |
| 10,504,022 B2* | 12/2019 | Temam | G06N 3/063 |
| 10,553,207 B2* | 2/2020 | Rotem | G10L 15/18 |
| 10,795,836 B2* | 10/2020 | McBride | G06F 9/5061 |
| 10,929,744 B2* | 2/2021 | Li | G06N 3/0454 |
| 2015/0261702 A1 | 9/2015 | Culurciello et al. | |
| 2016/0080670 A1 | 3/2016 | Rangan et al. | |
| 2016/0147571 A1 | 5/2016 | Barrere et al. | |
| 2017/0316312 A1 | 11/2017 | Goyal et al. | |
| 2018/0032911 A1* | 2/2018 | Yamazaki | G06N 20/00 |
| 2018/0075339 A1 | 3/2018 | Ma et al. | |
| 2018/0285726 A1* | 10/2018 | Baum | G06F 12/0646 |
| 2019/0034796 A1* | 1/2019 | Li | G06N 3/0445 |
| 2020/0042287 A1* | 2/2020 | Chalamalasetti | G06F 7/5443 |
| 2020/0234411 A1* | 7/2020 | Xu | H04N 9/646 |

FOREIGN PATENT DOCUMENTS

| | | |
|---|---|---|
| CN | 106022468 | 10/2016 |
| CN | 106228238 | 12/2016 |
| CN | 106228240 | 12/2016 |
| CN | 106355244 | 1/2017 |
| CN | 107679620 | 2/2017 |
| CN | 107003989 | 8/2017 |
| CN | 107016175 | 8/2017 |
| CN | 107451653 | 12/2017 |
| CN | 107679621 | 2/2018 |
| CN | 107844829 | 3/2018 |
| CN | 108171321 | 6/2018 |
| CN | 108229670 | 6/2018 |
| CN | 207458128 | 6/2018 |
| CN | 108280514 | 7/2018 |
| CN | 108470009 | 8/2018 |
| CN | 108549935 | 9/2018 |
| CN | 109359732 | 2/2019 |
| WO | WO 2016182659 | 11/2016 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Gao et al , "Research on Parallelization of Machine Learning Algorithms for On-Chip Heterogeneous Multi-Core Systems," Beijing University of Technology for Doctor Degree of Engineering, May 2017, 145 pages.

Li et al., "The Implementation of Activation Function of CNN Based on FPGA using Single Precision Floating-Point-Unit," Microelectronics & Computer, Oct. 2017, 35:105-109 (with English abstract).

Li, "Design and Implementation of Convolution Neural Network System Based on FPGA," Full-text Database of China's Excellent Master's Thesis, Feb. 2018, 69 pages (with English abstract).

Nakamoto, "Bitcoin: A Peer-to-Peer Electronic Cash System," www.bitcoin.org, 2005, 9 pages.

PCT International Search Report and Written Opinion in International Application No. PCT/CN2019/101069, dated Oct. 29, 2019, 9 pages (with partial English translation).

Raju K, "A Survey on Techniques for Cooperative CPU-GPU Computing," Sustainable Computing: Infomatics and System, Aug. 3, 2018, pp. 72-85.

Xiao et al., "Unified Virtual Memory Support Based on SoC FPGA," Proceedings of the 19th Annual Conference of Computer Engineering and Technology and the 5th Microprocessor Technology Forum, Dec. 2015, pp. 256-264, (with English abstract).

\* cited by examiner

CHIP AND CHIP-BASED DATA PROCESSING METHOD

CROSS-REFERENCE TO RELATED APPLICATIONS

This application is a continuation of PCT Application No. PCT/CN2019/101069, filed on Aug. 16, 2019, which claims priority to Chinese Patent Application No. 201811156129.6, filed on Sep. 30, 2018, and each application is hereby incorporated by reference in its entirety.

TECHNICAL FIELD

Embodiments of the present specification relate to the field of data processing technologies, and more specifically, to chips and chip-based data processing methods.

BACKGROUND

With the development of artificial intelligence technologies, the need for computing power is also growing. In particular, neural network prediction as an online service has a very high requirement for a processing delay. In this case, software running on a server CPU generally cannot satisfy this need. In the existing technology, the processing delay is shortened by using a hardware acceleration method. In this case, hardware needs to have certain flexibilities, so as to adapt to an upgrade of a neural network structure and a change in a length of to-be-processed data. When a large computing power is needed, hardware sends to-be-processed data to a chip through a Peripheral Component Interconnect Express (PCIE) bus. After the chip performs computation, the chip transmits a result to a program memory through the PCIE bus. Operator units in a chip are generally designed to be relatively universal and specific operations are specified by using control parameters delivered by a server CPU. For example, a common convolution operator unit is used to process various convolution operations. However, if a program includes multiple calls of operator units in the chip, the overhead of data exchange between the server CPU and the chip will be very large. Currently, a common practice is to design each operator unit, such as convolution control, in the chip into formatted binary instructions, then map calls at each layer of a neural network to these instructions, integrate them into a sequence, and then send the sequence to the chip. Logic on the chip parses each instruction and starts a corresponding operator unit.

Therefore, a more effective chip-based data processing solution is needed.

SUMMARY

Embodiments of the present specification are intended to provide a more effective chip-based data processing solution to reduce deficiencies in the existing technology.

To achieve the previous objective, an aspect of the present specification provides a chip-based data processing method, where the chip includes an embedded CPU and multiple operator units, and is configured to execute a computational task, and the method is performed on the chip, and includes the following: obtaining to-be-processed data; and performing, by the embedded CPU, the following steps to compute the computational task: configuring the multiple operator units, so that the multiple operator units respectively correspond to different types of computation included in the computational task, and computing the computational task by invoking the multiple operator units based on the to-be-processed data, to obtain a processing result.

Another aspect of the present specification provides a chip-based data processing method, where a chip includes an embedded CPU and multiple operator units, and is configured to perform predicted computation of a neural network, and the method is performed on the chip, and includes the following: obtaining to-be-processed data; and performing computation at each layer of the neural network based on the to-be-processed data, to obtain a processing result, where the embedded CPU performs the following steps to perform computation at each layer of the neural network: configuring the multiple operator units, so that the multiple operator units respectively correspond to different types of computation included in the layer, and performing computation at each neuron in the layer by invoking the multiple operator units based on a value of each neuron in an upper layer in the neural network, to obtain a value of each neuron in the layer.

In some embodiments, in the data processing method, the chip is connected to a server.

In some embodiments, in the data processing method, the to-be-processed data is transmitted to the chip through the server.

In some embodiments, in the data processing method, the embedded CPU performs the steps by running a program-based assembly instruction, and the program is transmitted to the chip through the server.

In some embodiments, in the data processing method, the program is a C language program.

In some embodiments, in the data processing method, the invoking the multiple operator units includes the following: invoking the multiple operator units by using a function call in the C language program.

In some embodiments, in the data processing method, the chip further includes a DMA module, and the method further includes the following: after the processing result is obtained, controlling, by the embedded CPU, the DMA module to write the processing result into a server memory.

In some embodiments, in the data processing method, the invoking the multiple operator units includes the following: invoking the multiple operator units asynchronously.

In some embodiments, in the data processing method, the configuring the multiple operator units includes the following: determining a length of the to-be-processed data, and obtaining a parameter to be sent to each operator unit based on the length.

In some embodiments, in the data processing method, the chip is configured to perform predicted computation of multiple neural networks, the obtaining to-be-processed data includes the following: obtaining the to-be-processed data and a neural network type corresponding to the to-be-processed data, and the performing computation at each layer of the neural network based on the to-be-processed data, to obtain a processing result includes the following: performing computation at each layer of a neural network of the type corresponding to the to-be-processed data based on the to-be-processed data and the neural network type, to obtain a processing result.

Another aspect of the present specification provides a chip, configured to execute a computational task, where the chip includes the following: multiple operator units; and an embedded CPU, configured to perform the following steps to compute the computational task: configuring the multiple operator units, so that the multiple operator units respectively correspond to different types of computation included in the computational task, and computing the computational task by invoking the multiple operator units based on to-be-processed data input from the outside of the chip, to obtain a processing result.

Another aspect of the present specification provides a chip, configured to perform predicted computation of a neural network, where the chip includes the following: multiple operator units; and an embedded CPU, configured to perform computation at each layer of the neural network based on to-be-processed data input from the outside of the chip, to obtain a processing result, where the embedded CPU performs the following steps to perform computation at each layer of the neural network: configuring the multiple operator units, so that the multiple operator units respectively correspond to different types of computation included in the layer, and performing computation at each neuron in the layer by invoking the multiple operator units based on a value of each neuron in an upper layer in the neural network, to obtain a value of each neuron in the layer.

In some embodiments, the chip is connected to a server.

In some embodiments, in the chip, the to-be-processed data is transmitted to the chip through the server.

In some embodiments, in the chip, the embedded CPU performs the steps by running a program-based assembly instruction, and the program is transmitted to the chip through the server.

In some embodiments, in the chip, the program is a C language program.

In some embodiments, in the chip, the embedded CPU is further configured to invoke the multiple operator units by using a function call in a C language.

In some embodiments, in the chip, the chip further includes a DMA module, and the embedded CPU is further configured to control the DMA module to write the processing result into a server memory after the processing result is obtained.

In some embodiments, in the chip, the embedded CPU is further configured to invoke the multiple operator units asynchronously.

In some embodiments, in the chip, the embedded CPU is further configured to determine a length of the to-be-processed data, and obtain a parameter to be sent to each operator unit based on the length.

In some embodiments, in the chip, the chip is an ASIC chip or an FPGA chip.

In some embodiments, the chip is configured to perform predicted computation of multiple neural networks, and the embedded CPU is further configured to perform computation at each layer of a neural network of a type corresponding to the to-be-processed data input from the outside of the chip based on the to-be-processed data and the neural network type, to obtain a processing result.

Another aspect of the present specification provides a computing device, including a memory and a processor, where the memory stores executable code, and the processor executes the executable code to perform the previously described data processing method.

According to the chip-based data processing solution in the embodiments of the present specification, because the embedded CPU is introduced, control of a relatively small operator can be completed inside the chip. Calling a C language function greatly reduces space of a program instruction. In addition, a C program on the embedded CPU can perfectly perform an operation of a control type, for example, nesting various if/for/while statements. The C program on the embedded CPU can be used to determine a length of input data, and flexibly generate a parameter to be sent to each operator unit during computation. In addition, when a structure of the neural network is upgraded, a new program can be transmitted to the chip through the server, to perform predicted computation of the updated neural network.

BRIEF DESCRIPTION OF DRAWINGS

By describing the embodiments of the present specification with reference to the accompanying drawings, the embodiments of the present specification can be made clearer.

DESCRIPTION OF EMBODIMENTS

The following describes the embodiments of the present specification with reference to the accompanying drawings.

Figure 1:
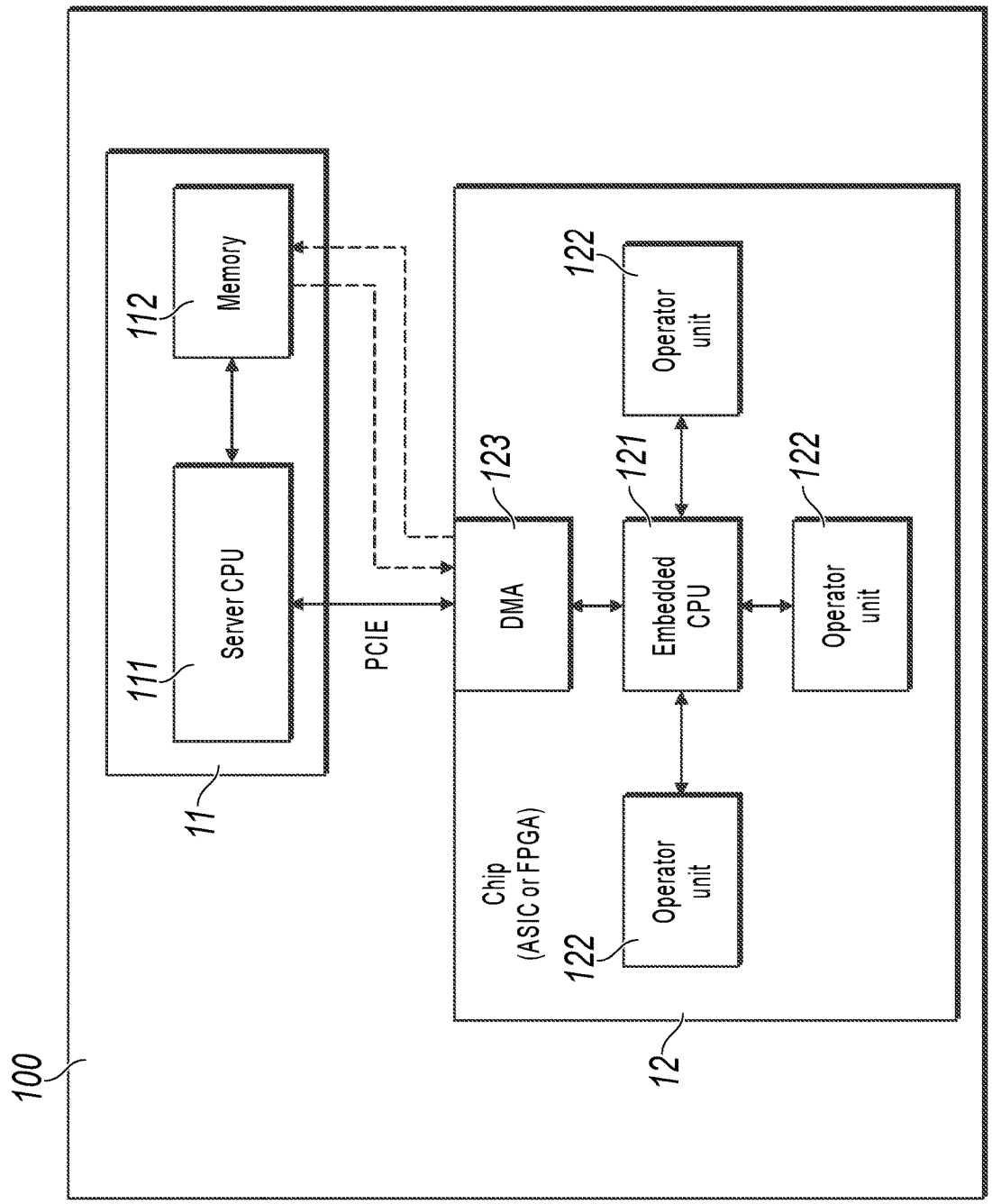
FIG. 1 is a schematic diagram illustrating a data processing system 100, according to an embodiment of the present specification.

FIG. 1 is a schematic diagram illustrating a data processing system 100, according to an embodiment of the present specification. As shown in FIG. 1, the system 100 includes a server 11 and a chip 12, which are connected through a PCIE bus, for example. The server 11 includes a server CPU 111 and a memory 112. The chip 12 includes an embedded CPU 121, multiple operator units 122, and a DMA module 123. The chip 12 is configured to execute a computational task, for example, predicted computation of a neural network. When the server 11 needs to invoke the chip 12 to perform predicted computation of a neural network, etc., the server 11 transmits, by using the server CPU 111, for example, to-be-processed data used for prediction of the neural network from the memory to the chip through the PCIE bus. The embedded CPU 121 in the chip 12 schedules each operator unit 122 by running a program to complete computation at each layer of the neural network based on the to-be-processed data, to obtain a final processing result, namely, a prediction result of the neural network. After the processing result is obtained, the embedded CPU 121 controls the DMA module to transmit the processing result to the server memory 112 through the PCIE bus.

Figure 2:
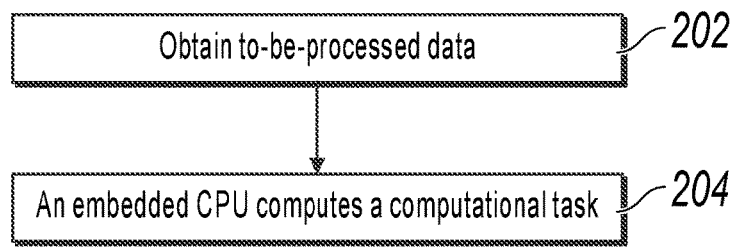
FIG. 2 shows a chip-based data processing method, according to an embodiment of the present specification.

FIG. 2 shows a chip-based data processing method, according to an embodiment of the present specification. A chip includes an embedded CPU and multiple operator units, and is configured to execute a computational task, and the method is performed on the chip, and includes the following steps:

Step 202: Obtain to-be-processed data.

Step 204: The embedded CPU performs the following steps to compute the computational task: configuring the multiple operator units, so that the multiple operator units respectively correspond to different types of computation included in the computational task, and computing the computational task by invoking the multiple operator units based on the to-be-processed data, to obtain a processing result.

First, in step 202, the to-be-processed data is obtained. In some embodiments, the chip is connected to a server. When invoking the chip for computation, the server transmits the to-be-processed data to the chip. It can be understood that the chip is not limited to be connected to the server. For example, the chip can be standalone hardware used to compute a task, and the chip obtains the to-be-processed data by using an input module of the chip.

In some embodiments, the chip is located on a PCIE card, and is an ASIC chip or an FPGA chip. The server transmits the to-be-processed data to the chip through a PCIE bus by using a server CPU. In some embodiments, the server transmits the to-be-processed data to the chip by using an application program running on the server. In some embodiments, the chip can simultaneously receive to-be-processed data transmitted by multiple application programs, and the chip collects the multiple pieces of to-be-processed data by using the embedded CPU.

In step 204, the embedded CPU performs the following steps to compute the computational task: configuring the multiple operator units, so that the multiple operator units respectively correspond to different types of computation included in the computational task, and computing the computational task by invoking the multiple operator units based on the to-be-processed data, to obtain a processing result.

The embedded CPU performs the computation by running a program-based assembly instruction. The program is, for example, a C language program. The chip translates the program into an assembly language program by using a system-on-a-chip (SOC) of the chip, for example. The program is transmitted by the server to the chip.

During computation, the embedded CPU first configures the multiple operator units by running a program, so that the multiple operator units respectively correspond to different types of computation included in the computational task. The different types of computation include, for example, matrix multiplication, vector addition, and non-linear operation, etc. Then the embedded CPU continues to run the program to perform a specific computation process. The computation is performed based on the to-be-processed data. When the computation includes various types of computation, each corresponding operator unit is invoked to complete the computation. In a complex computational task, multiple rounds of computation may be needed to obtain a final processing result. In each round of computation, an operator unit is reconfigured by using a predetermined program, so as to satisfy a computation need of the round.

In some embodiments, for example, the computational task is predicted computation of a neural network. In this case, the embedded CPU performs computation at each layer of the neural network based on the to-be-processed data, to obtain a processing result, namely, a prediction result of the neural network. The embedded CPU performs the following steps to perform computation at each layer of the neural network: configuring the multiple operator units, so that the multiple operator units respectively correspond to different types of computation included in the layer, and performing computation at each neuron in the layer by invoking the multiple operator units based on a value of each neuron in an upper layer in the neural network, to obtain a value of each neuron in the layer.

In other words, for each layer of the neural network, the embedded CPU reconfigures an operator unit, and sequentially performs computation at each neuron in the layer. In terms of the C language program, the program can be cycled in two loops. In the outer loop, the program is cycled n times to perform computation at each layer of the neural network except for an input layer, where n is a quantity of layers of the neural network except for the input layer. In the inner loop, for computation at each layer, the program is cycled m times to perform computation at each neuron in the layer, where m is a quantity of neurons.

Figure 3:
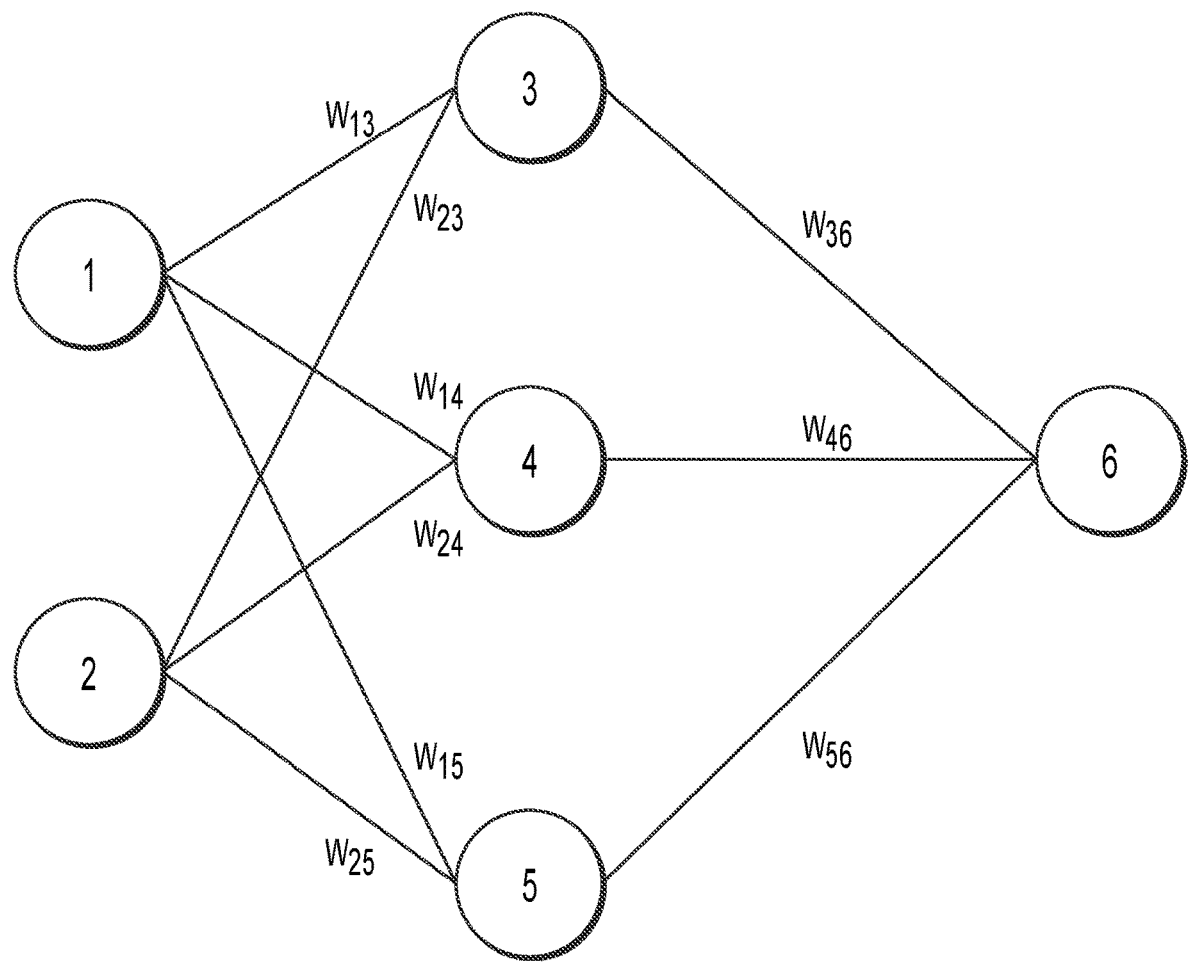
FIG. 3 is a schematic diagram illustrating a neural network.

FIG. 3 is a schematic diagram illustrating a neural network. As shown in FIG. 3, a left layer is an input layer, which includes two input neurons (1) and (2), an intermediate layer is a hidden layer, which includes three neurons (3), (4), and (5), and a right layer is an output layer, which includes output neuron (6). In the intermediate layer, parameters of neuron (3) for neurons in the upper layer are $W_{13}$ and $W_{23}$, parameters of neuron (4) include $W_{14}$ and $W_{24}$, and parameters of neuron (5) include $W_{15}$ and $W_{25}$. Parameters of neuron (6) include $W_{36}$, $W_{46}$, and $W_{56}$.

During computation of the neural network shown in FIG. 3, first, computation is performed at the intermediate layer. For example, the computation at this layer includes matrix multiplication and vector addition. Therefore, the embedded CPU can configure two operator units respectively corresponding to the matrix multiplication and the vector addition, and respectively perform computation at the neurons (3), (4), and (5) by cycling a program. For example, during computation of neuron (3), to-be-processed data obtained from the input layer and the parameters ($W_{13}$ and $W_{23}$) of neuron (3) can be input into the previously described two operator units to obtain an intermediate result of neuron (3), which can be considered as a value of neuron (3).

After computation at the intermediate layer is completed (i.e., values of the neurons (3), (4), and (5) are obtained), the embedded CPU enters a next cycle in the outer loop, in other words, the embedded CPU performs computation at the output layer. For example, the computation at the output layer includes sigmoid function computation. Therefore, the embedded CPU configures an operator unit for performing sigmoid function computation based on a running program, and performs computation at neuron (6). During computation of neuron (6), the embedded CPU invokes the operator unit based on the running program, and inputs the values of the neuron (3), (4), and (5) and the parameters of neuron (6) into the operator unit, to obtain a value of neuron (6), where the value is a predicted value of the neural network.

It can be seen from the previous computation examples of the neural network shown in FIG. 3 that, during computation of each neuron, a corresponding operator unit is invoked to perform specific computation, to obtain a value of the neuron. When the neuron is located at the hidden layer of the neural network, the obtained value of the neuron is an intermediate result, and the intermediate result is stored in the chip or in a DDR memory in a PCIE card where the chip is located, and used for subsequent computation. When the neuron is located at the output layer of the neural network, the obtained value of the neuron is the predicted value of the neural network, and the embedded CPU configures a DMA descriptor, to control a DMA module to write the predicted value into a server memory.

The data processing method in the embodiments of the present specification is particularly applicable to predicted computation of a neural network. For computation of a neural network in a chip, currently, a common practice is to design each operator unit, such as convolution control, in the chip into formatted binary instructions, then map calls at each layer of the neural network to these instructions, integrate them into a sequence, and then send the sequence to the chip. Logic on the chip parses each instruction and starts a corresponding operator unit. However, the method is applicable to a relatively large operator. For control of a relatively small operator, the instruction sequence method has low efficiency, and a quantity of instruction sequences is very large. For an operation of a control type, the instruction sequence method can hardly be completed (e.g., it is difficult to nest multiple loops by using an instruction sequence). If an input data length adaptation problem exists, for example, if sizes of input images of a CNN network are different or input audio lengths of an LSTM network are different, an instruction sequence is unsuitable. If an instruction sequence is downloaded again each time input data lengths are different, the delay caused by this process is very long for the service.

According to the chip-based data processing solution in the embodiments of the present specification, because the embedded CPU is introduced, control of a relatively small operator can be completed inside the chip. Calling a C language function greatly reduces space of a program instruction. In addition, the C program on the embedded CPU can perfectly perform an operation of a control type, for example, nesting various if/for/while statements. A C program on the embedded CPU can be used to determine a length of input data, and flexibly generate a parameter to be sent to each operator unit during computation. In addition, when a structure of the neural network is upgraded, a new program can be transmitted to the chip through the server, to perform predicted computation of the updated neural network.

In some embodiments, the embedded CPU is further configured to invoke the multiple operator units by using a function call in a C language.

In some embodiments, the chip further includes a DMA module, and the embedded CPU is further configured to control the DMA module to write the processing result into a server memory after the processing result is obtained.

In some embodiments, the embedded CPU is further configured to invoke the multiple operator units asynchronously. The multiple operator units are invoked asynchronously, so that the multiple operator units can work concurrently to the greatest extent possible, thereby improving hardware utilization.

In some embodiments, the embedded CPU is further configured to determine a length of the to-be-processed data or input data of each layer of the neural network, and obtain a parameter to be sent to each operator unit based on the length.

In some embodiments, the chip is configured to perform predicted computation of multiple neural networks, the obtaining to-be-processed data includes the following: obtaining the to-be-processed data and a neural network type corresponding to the to-be-processed data, and the performing computation at each layer of the neural network based on the to-be-processed data, to obtain a processing result includes the following: performing computation at each layer of a neural network of the type corresponding to the to-be-processed data based on the to-be-processed data and the neural network type, to obtain a processing result. The multiple neural networks include, for example, a convolutional neural network (CNN), a deep neural network (DNN), and a recurrent neural network (RNN). For example, the chip obtains control information (e.g., a neural network identifier) indicating a neural network type, to obtain the neural network type. After obtaining the neural network type, the chip selects a program corresponding to the type from the embedded CPU based on the neural network type, and runs the program, to perform computation of the neural network of the type.

Figure 4:
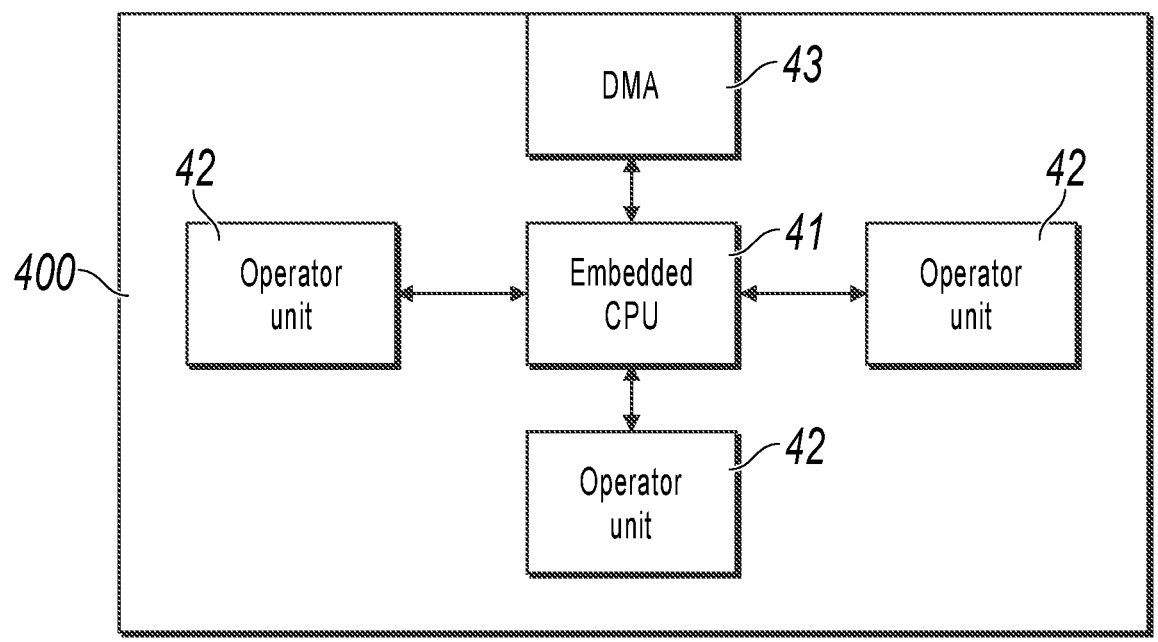
FIG. 4 shows a chip 400, according to an embodiment of the present specification.

FIG. 4 shows a chip 400, according to an embodiment of the present specification. The chip is configured to execute a computational task, and the chip includes the following: multiple operator units 41; and an embedded CPU 42, configured to perform the following steps to compute the computational task: configuring the multiple operator units, so that the multiple operator units respectively correspond to different types of computation included in the computational task, and computing the computational task by invoking the multiple operator units based on to-be-processed data input from the outside of the chip, to obtain a processing result.

In some embodiments, the computational task is predicted computation of a neural network, and the embedded CPU 42 is configured to perform computation at each layer of the neural network based on to-be-processed data input from the outside of the chip, to obtain a processing result, where the embedded CPU performs the following steps to perform computation at each layer of the neural network: configuring the multiple operator units, so that the multiple operator units respectively correspond to different types of computation included in the layer, and performing computation at each neuron in the layer by invoking the multiple operator units based on a value of each neuron in an upper layer in the neural network, to obtain a value of each neuron in the layer.

In some embodiments, the chip is connected to a server.

In some embodiments, in the chip, the to-be-processed data is transmitted to the chip through the server.

In some embodiments, in the chip, the embedded CPU performs the steps by running a program-based assembly instruction, and the program is transmitted to the chip through the server.

In some embodiments, in the chip, the program is a C language program.

In some embodiments, in the chip, the embedded CPU is further configured to invoke the multiple operator units by using a function call in a C language.

In some embodiments, in the chip, the chip further includes a DMA module 43, and the embedded CPU is further configured to control the DMA module to write the processing result into a server memory after the processing result is obtained.

In some embodiments, in the chip, the embedded CPU is further configured to invoke the multiple operator units asynchronously.

In some embodiments, in the chip, the embedded CPU is further configured to determine a length of the to-be-processed data, and obtain a parameter to be sent to each operator unit based on the length.

In some embodiments, in the chip, the chip is an ASIC chip or an FPGA chip.

In some embodiments, the chip is configured to perform predicted computation of multiple neural networks, and the embedded CPU is further configured to perform computation at each layer of a neural network of a type corresponding to the to-be-processed data input from the outside of the chip based on the to-be-processed data and the neural network type, to obtain a processing result.

Another aspect of the present specification provides a computing device, including a memory and a processor, where the memory stores executable code, and the processor executes the executable code to perform the data processing method shown in FIG. 2.

According to the chip-based data processing solution in the embodiments of the present specification, because the embedded CPU is introduced, control of a relatively small operator can be completed inside the chip. Calling a C language function greatly reduces space of a program instruction. In addition, a C program on the embedded CPU can perfectly perform an operation of a control type, for example, nesting various if/for/while statements. The C program on the embedded CPU can be used to determine a length of input data, and flexibly generate a parameter to be sent to each operator unit during computation. In addition, when a structure of the neural network is upgraded, a new program can be transmitted to the chip through the server, to perform predicted computation on the updated neural network.

The embodiments of the present specification are described in a progressive way. For same or similar parts of the embodiments, references can be made to the embodiments. Each embodiment focuses on a difference from other embodiments. Particularly, a system embodiment is basically similar to a method embodiment, and therefore, is described briefly. For related parts, references can be made to related descriptions in the method embodiment.

Specific embodiments of the present specification are described above. Other embodiments fall within the scope of the appended claims. In some situations, the actions or steps described in the claims can be performed in an order different from the order in the embodiment and the desired results can still be achieved. In addition, the process depicted in the accompanying drawings does not necessarily require a particular execution order to achieve the desired results. In some embodiments, multi-tasking and parallel processing may be advantageous.

A person of ordinary skill in the art should be further aware that, in combination with the examples described in the embodiments disclosed in the present specification, units and algorithm steps can be implemented by electronic hardware, computer software, or a combination thereof. To clearly describe interchangeability between the hardware and the software, compositions and steps of each example are described above based on functions. Whether the functions are performed by hardware or software depends on particular applications and design constraint conditions of the technical solutions. A person of ordinary skill in the art can use different methods to implement the described functions for each particular application, but it should not be considered that the embodiment goes beyond the scope of the present application.

Steps of methods or algorithms described in the embodiments disclosed in the present specification can be implemented by hardware, a software module executed by a processor, or a combination thereof. The software module can reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the described specific embodiments, the objective, technical solutions, and benefits of the present disclosure are further described in detail. It should be understood that the descriptions are merely specific embodiments of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. A data processing method performed by a chip based on neural networks, the method comprising:
    obtaining data associated with one or more neural networks transmitted from a server;
    for each layer of a neural network of the one or more neural networks,
        configuring, based on the data, a plurality of operator units based on a type of computation each operator unit performs; and
        invoking the plurality of operator units, to perform computations of the data for each neuron, based on neurons of a layer of the neural network immediately above, to produce a value of the neuron;
    wherein the neural network comprises at least one inner layer, at least one intermediate layer, and at least one output layer;
    wherein the computations are performed based on a program cycled in an inner loop and an outer loop;
    wherein in the outer loop, the program is cycled n times to perform computations at each layer of the at least one intermediate layer and the at least one output layer, where n is a quantity of layers of the at least one intermediate layer and the at least one output layer; and
    wherein in the inner loop, the program is cycled m times to perform computations at each neuron in a corresponding layer of the neural network, where m is a quantity of neurons in the corresponding layer.

2. The data processing method according to claim 1, wherein the computations are performed based on program-based assembly instructions received from the server.

3. The data processing method according to claim 1, wherein the plurality of operator units are invoked by using a function call in a C language program.

4. The data processing method according to claim 1, wherein the chip comprises a direct memory access (DMA) module, and the method further comprises controlling the DMA module to send the value of the neuron to be stored by the server.

5. The data processing method according to claim 1, wherein the plurality of operator units are invoked asynchronously.

6. The data processing method according to claim 1, wherein the configuring the plurality of operator units comprises:
    determining a length of the data; and
    obtaining a parameter to be sent to each of the plurality of operator units based on the length.

7. The data processing method according to claim 1, wherein the data transmitted from the server comprises a neural network type corresponding to each of the one or more neural networks, and the computations are performed further based on the neural network type.

8. A non-transitory, computer-readable medium storing one or more instructions executable by a chip to perform operations comprising:
    obtaining data associated with one or more neural networks transmitted from a server;
    for each layer of a neural network of the one or more neural networks,
        configuring, based on the data, a plurality of operator units based on a type of computation each operator unit performs; and
        invoking the plurality of operator units, to perform computations of the data for each neuron, based on neurons of a layer of the neural network immediately above, to produce a value of the neuron
    wherein the neural network comprises at least one inner layer, at least one intermediate layer, and at least one output layer;
    wherein the computations are performed based on a program cycled in an inner loop and an outer loop;
    wherein in the outer loop, the program is cycled n times to perform computations at each layer of the at least one intermediate layer and the at least one output layer, where n is a quantity of layers of the at least one intermediate layer and the at least one output layer; and wherein in the inner loop, the program is cycled m times to perform computations at each neuron in a corresponding layer of the neural network, where m is a quantity of neurons in the corresponding layer.

9. The non-transitory, computer-readable medium according to claim 8, wherein the computations are performed based on program-based assembly instructions received from the server.

10. The non-transitory, computer-readable medium according to claim 8, wherein the plurality of operator units are invoked by using a function call in a C language program.

11. The non-transitory, computer-readable medium according to claim 8, wherein the chip comprises a direct memory access (DMA) module, and the operations further comprise controlling the DMA module to send the value of the neuron to be stored by the server.

12. The non-transitory, computer-readable medium according to claim 8, wherein the plurality of operator units are invoked asynchronously.

13. The non-transitory, computer-readable medium according to claim 8, wherein the configuring the plurality of operator units comprises:
determining a length of the data; and
obtaining a parameter to be sent to each of the plurality of operator units based on the length.

14. The non-transitory, computer-readable medium according to claim 8, wherein the data transmitted from the server comprises a neural network type corresponding to each of the one or more neural networks, and the computations are performed further based on the neural network type.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining data associated with one or more neural networks transmitted from a server;
for each layer of a neural network of the one or more neural networks,
configuring, based on the data, a plurality of operator units based on a type of computation each operator unit performs; and
invoking the plurality of operator units, to perform computations of the data for each neuron, based on neurons of a layer of the neural network immediately above, to produce a value of the neuron wherein the neural network comprises at least one inner layer, at least one intermediate layer, and at least one output layer;

wherein the computations are performed based on a program cycled in an inner loop and an outer loop;

wherein in the outer loop, the program is cycled n times to perform computations at each layer of the at least one intermediate layer and the at least one output layer, where n is a quantity of layers of the at least one intermediate layer and the at least one output layer; and wherein in the inner loop, the program is cycled m times to perform computations at each neuron in a corresponding layer of the neural network, where m is a quantity of neurons in the corresponding layer.

16. The computer-implemented system according to claim 15, wherein the computations are performed based on program-based assembly instructions received from the server.

17. The computer-implemented system according to claim 15, wherein the plurality of operator units are invoked by using a function call in a C language program.

18. The computer-implemented system according to claim 15, wherein the one or more computers comprise a direct memory access (DMA) module, and the operations further comprise controlling the DMA module to send the value of the neuron to be stored by the server.

19. The computer-implemented system according to claim 15, wherein the plurality of operator units are invoked asynchronously.

20. The computer-implemented system according to claim 15, wherein the configuring the plurality of operator units comprises:
determining a length of the data; and
obtaining a parameter to be sent to each of the plurality of operator units based on the length.

21. The computer-implemented system according to claim 15, wherein the data transmitted from the server comprises a neural network type corresponding to each of the one or more neural networks, and the computations are performed further based on the neural network type.

* * * * *

UNITED STATES PATENT AND TRADEMARK OFFICE
CERTIFICATE OF CORRECTION

| | | |
|---|---|---|
| PATENT NO. | : 11,062,201 B2 | Page 1 of 1 |
| APPLICATION NO. | : 17/084936 | |
| DATED | : July 13, 2021 | |
| INVENTOR(S) | : Guozhen Pan et al. | |

It is certified that error appears in the above-identified patent and that said Letters Patent is hereby corrected as shown below:

In the Claims

Column 10, Line 60, in Claim 8, delete "neuron" and insert -- neuron; --, therefor.

Column 12, Line 7, in Claim 15, delete "neuron" and insert -- neuron; --, therefor.

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*